(12) United States Patent
Kiyonaga et al.

(10) Patent No.: US 10,014,018 B1
(45) Date of Patent: Jul. 3, 2018

(54) DATA STORAGE DEVICE SEEKING MULTIPLE VOICE COIL MOTORS USING A LIMITED CURRENT SUPPLY

(71) Applicant: Western Digital Technologies, Inc., Irvine, CA (US)

(72) Inventors: Toshihisa Kiyonaga, San Jose, CA (US); Peng Huang, Lake Forest, CA (US); Kexiu Liu, Foothill Ranch, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/843,076

(22) Filed: Dec. 15, 2017

(51) Int. Cl.
*G11B 5/09* (2006.01)
*G11B 5/55* (2006.01)

(52) U.S. Cl.
CPC .................. *G11B 5/5547* (2013.01)

(58) Field of Classification Search
None
See application file for complete search history.

(56) References Cited

U.S. PATENT DOCUMENTS

| | | | | |
|---|---|---|---|---|
| 5,261,058 A * | 11/1993 | Squires | ................. | G06F 3/0601 360/78.12 |
| 5,604,719 A * | 2/1997 | Kakimoto | ......... | G11B 11/10502 369/13.21 |
| 5,822,281 A * | 10/1998 | Yumita | .............. | G11B 7/08529 369/13.32 |
| 6,005,747 A * | 12/1999 | Gilovich | .................. | G11B 5/54 360/98.07 |
| 6,101,065 A | 8/2000 | Alfred et al. | | |
| 6,111,720 A | 8/2000 | Clare et al. | | |
| 6,121,742 A | 9/2000 | Misso | | |
| 6,282,049 B1 * | 8/2001 | Cameron | ................. | G11B 5/54 360/75 |
| 6,512,650 B1 * | 1/2003 | Tanner | ..................... | G11B 5/54 360/69 |
| 6,847,504 B1 | 1/2005 | Bennett et al. | | |
| 6,987,639 B1 * | 1/2006 | Yu | ........................ | G11B 5/5526 360/78.04 |
| 7,315,429 B2 | 1/2008 | van Zyl | | |
| 9,165,583 B1 | 10/2015 | Beker | | |
| 9,940,958 B1 * | 4/2018 | Kiyonaga | ............ | G11B 5/5582 |
| 2001/0030826 A1 * | 10/2001 | Thia | .................... | G11B 5/59611 360/69 |
| 2004/0080858 A1 * | 4/2004 | Suzuki | ..................... | G11B 5/54 360/75 |

(Continued)

*Primary Examiner* — Peter Vincent Agustin

(57) ABSTRACT

A data storage device is disclosed comprising a first voice coil motor (VCM) configured to actuate a first head, and a second VCM configured to actuate a second head. A high priority is assigned to the first VCM and a low priority to the second VCM. A first access command is serviced using the first head by seeking the first VCM using a first high performance seek profile. When seeking the second VCM without seeking the first VCM, a second access command is serviced using the second head using a second high performance seek profile. When concurrently seeking the first VCM and the second VCM, the seeking of the second VCM is with a reduced performance seek profile, wherein the second high performance seek profile decreases a seek time of the second VCM compared to the reduced performance seek profile.

26 Claims, 5 Drawing Sheets

(56) References Cited

U.S. PATENT DOCUMENTS

| | | | |
|---|---|---|---|
| 2006/0056099 A1* | 3/2006 | Hashimoto | G11B 5/59633 360/75 |
| 2010/0067138 A1* | 3/2010 | Ooi | G11B 5/54 360/71 |

* cited by examiner

DATA STORAGE DEVICE SEEKING MULTIPLE VOICE COIL MOTORS USING A LIMITED CURRENT SUPPLY

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
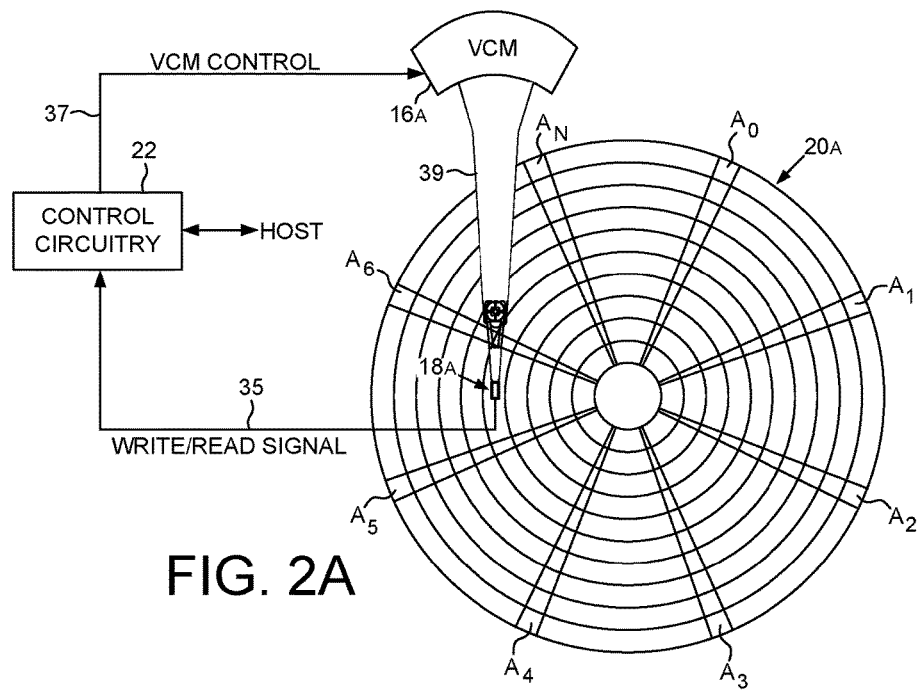
FIGS. 2A and 2B show a data storage device in the form of a disk drive according to an embodiment comprising first and second VCMs configured to actuate respective heads over disk surfaces.
Figure 2B:
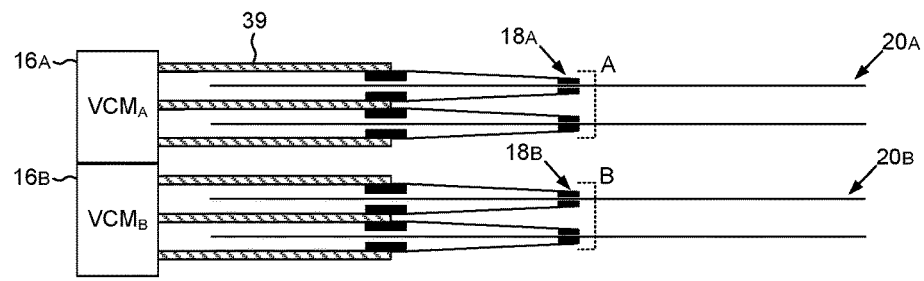
Figure 2C:
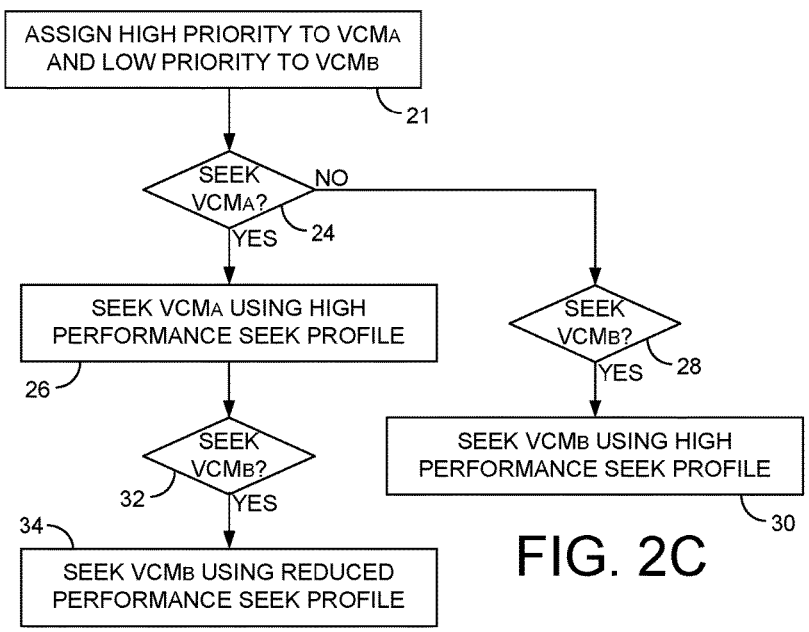
FIG. 2C is a flow diagram according to an embodiment wherein when concurrently seeking both VCMs, one is controlled using a high performance seek profile and the other is controlled using a reduced performance seek profile.

FIG. 2A shows a data storage device in the form of a disk drive according to an embodiment comprising a first voice coil motor (VCM$_A$) $16_A$ configured to actuate a first head $18_A$ over a first disk $20_A$, and a second VCM$_B$ $16_B$ configured to actuate a second head $18_B$ over a second disk $20_B$. The disk drive further comprises control circuitry 22 configured to execute the flow diagram of FIG. 2C, wherein a high priority is assigned to the first VCM$_A$ and a low priority to the second VCM$_B$ (block 21). A first access command is serviced using the first head by seeking (block 24) the first VCM$_A$ using a first high performance seek profile (block 26). When seeking (block 28) the second VCM$_B$ without seeking the first VCM$_A$, a second access command is serviced using the second head by seeking the second VCM$_B$ using a second high performance seek profile (block 30). When concurrently seeking the first VCM$_A$ and the second VCM$_B$ (block 32), the seeking of the first head is with the first high performance seek profile (block 26) and the seeking of the second VCM$_B$ is with a reduced performance seek profile (block 34), wherein the second high performance seek profile (at block 30) decreases a seek time of the second VCM$_B$ compared to the reduced performance seek profile (at block 34).

Figure 1:
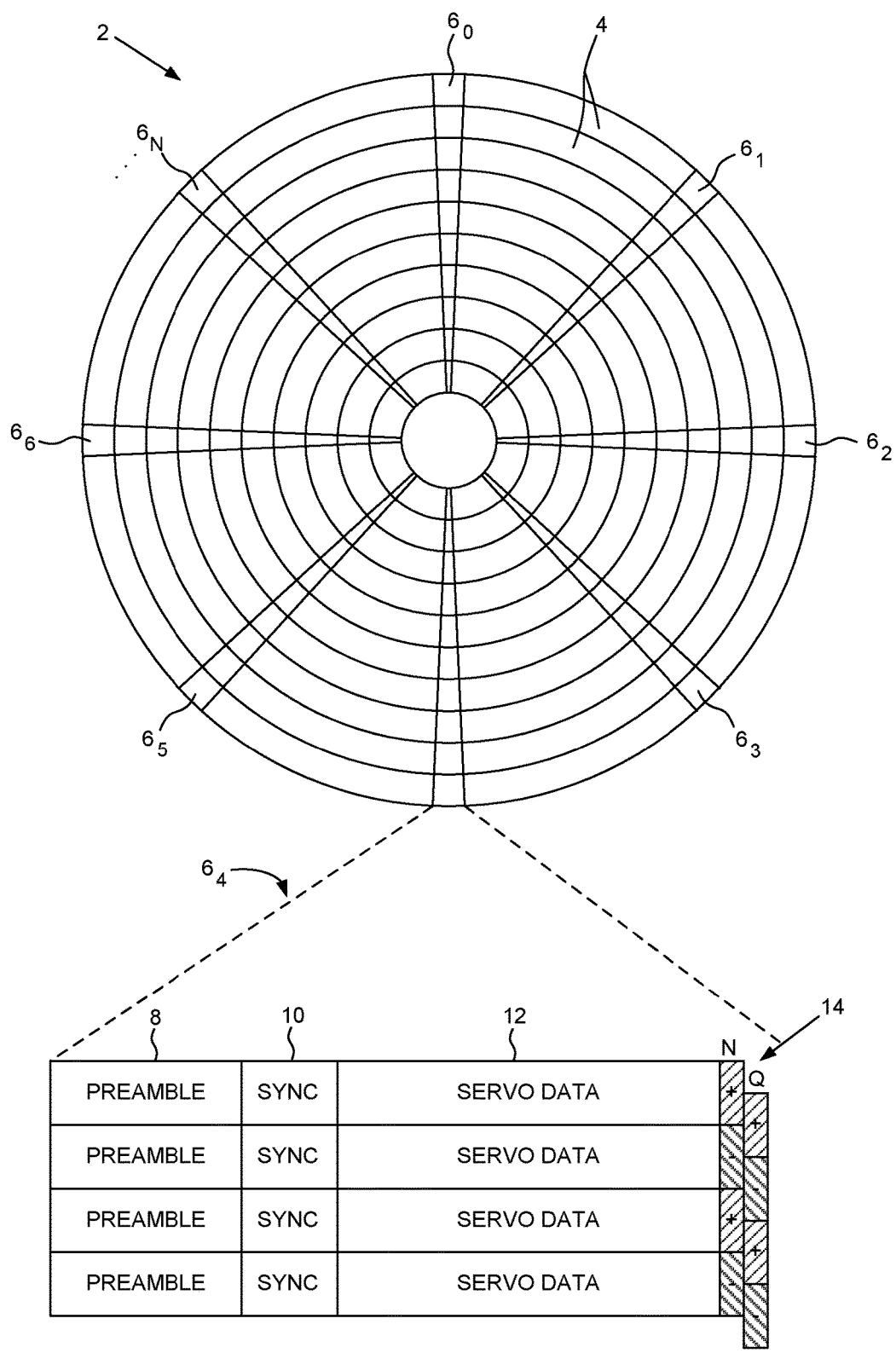
FIG. 1 shows a prior art disk format comprising a plurality of servo tracks defined by servo sectors.

In the embodiment of FIG. 2A, each disk comprises a plurality of servo sectors (e.g., $A_0$-$A_N$) that define a plurality of servo tracks, wherein data tracks are defined relative to the servo tracks at the same or different radial density. The control circuitry 22 processes a read signal 35 emanating from the respective head to demodulate the servo sectors and generate a position error signal (PES) representing an error between the actual position of the head and a target position relative to a target track. A servo control system in the control circuitry 22 filters the PES using a suitable compensation filter to generate a control signal 37 applied to the respective VCM which rotates an actuator arm 39 about a pivot in order to actuate the head radially over the disk in a direction that reduces the PES. The servo sectors may comprise any suitable head position information, such as a track address for coarse positioning and servo bursts for fine positioning. The servo bursts may comprise any suitable pattern, such as an amplitude based servo pattern or a phase based servo pattern (FIG. 1).

In the embodiment of FIG. 2A, the first VCM$_A$ $16_A$ and the second VCM$_B$ $16_B$ rotate respective actuator arms about a common pivot in what may be referred to as a split actuator design. In another embodiment, the first VCM$_A$ and the second VCM$_B$ may be separated so as to rotate respective actuator arms about independent pivots. Also in the embodiment of FIG. 2A, the disk drive comprises four disks having respective heads actuated over top and bottom disk surfaces. Other embodiments may employ a different number of head/disk combinations, and still other embodiment may employ more than two VCMs for independent actuation of one or more heads.

Figure 3:
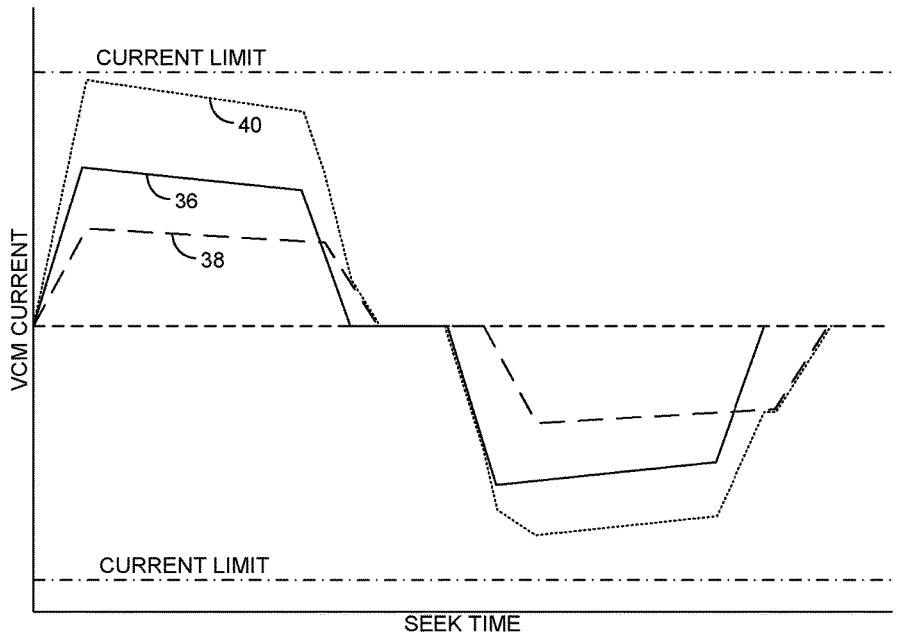
FIG. 3 shows an embodiment wherein the reduced performance seek profile helps prevent the current consumption of the disk drive from exceeding a current limit.

In the embodiments described herein, a different priority may be assigned to each VCM for any suitable reason. For example, in one embodiment a high/low priority may be assigned to each VCM to limit the peak current consumption of the disk drive when concurrently seeking both VCMs. FIG. 3 shows an example of this embodiment including a high performance seek profile 36 used to seek a high priority VCM, a reduced performance seek profile 38 used to concurrently seek a low priority VCM the same seek distance, and a resulting total current 40 consumed by the disk drive during the concurrent seek. In this embodiment, the reduced performance seek profile 38 helps prevent the total current 40 from exceeding a current limit specified, for example, by a host device. In the embodiment of FIG. 3, the reduced performance seek profile 38 reduces the amplitude of the driving current during the acceleration/deceleration phase which reduces the current consumed by the low priority VCM at the cost of increasing the seek time as compared to the high priority VCM.

Figure 4:
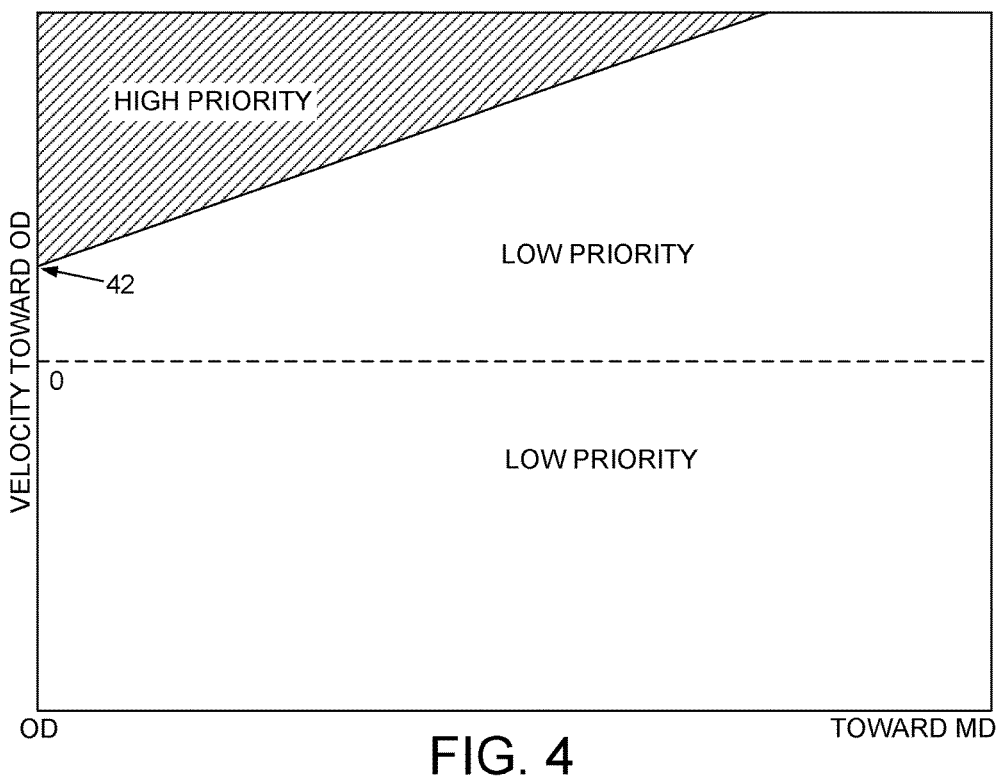
FIG. 4 shows an embodiment wherein the reduced performance seek profile helps prevent damaging the heads during an emergency unload when one of the VCMs is seeking at a high velocity toward a ramp at the outer diameter of the disk.

FIG. 4 shows an embodiment wherein assigning a different priority to each VCM may help prevent damage to the heads during an emergency unload operation. In one embodiment during a power failure the first and second disks rotating causes a spindle motor to generate a back electromotive force (BEMF) voltage, wherein the reduced performance seek profile increases a braking power supplied by the BEMF voltage to a high priority VCM during the power failure. For example, a high priority may be assigned to a VCM that is seeking at a high speed (e.g., using a high priority seek profile) toward a ramp 42 near an outer diameter (OD) of the disk as illustrated in FIG. 4. If a power failure occurs while the high priority VCM is seeking toward the OD, in one embodiment it may be desirable to ensure the BEMF voltage from the spindle motor can provide enough braking power to slow the high priority VCM before the heads contact the ramp so as to prevent damaging the heads. Accordingly, in one embodiment when concurrently seeking both VCMs a high/low priority is assigned to each VCM based on their respective seek directions and proximity relative to the OD (or ID) of the disk. Seeking the low priority VCM using a reduced performance seek profile such as shown in FIG. 3 means that more braking power can be supplied by the BEMF voltage to the high priority VCM if a power failure occurs during the seeks. That is, if a high performance seek profile were used to seek both VCMs and a power failure occurred, the BEMF voltage from the spindle motor may be unable to supply enough braking power to slow both VCMs, thereby causing the heads of the high priority VCM to contact the ramp at an excessive speed during the emergency unload operation.

Figure 5:
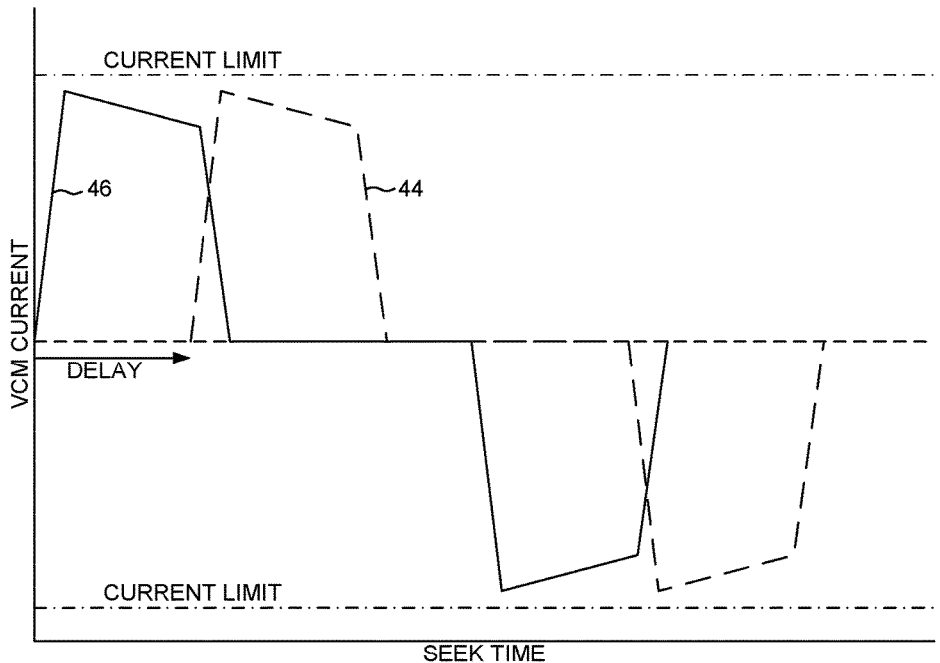
FIG. 5 shows an embodiment wherein the reduced performance seek profile delays the seek in order to help prevent the current consumption of the disk drive from exceeding a current limit.

Any suitable low performance seek profile may be employed in the embodiments described herein in order to concurrently seek a low priority VCM. FIG. 5 shows an embodiment wherein when concurrently seeking both VCMs the same seek distance, the seek profiles may be similar (e.g., the same acceleration/deceleration amplitudes), but the low performance seek profile 44 may be delayed relative to the high performance seek profile 46. In the example of FIG. 5, the delay of the reduced performance seek profile overlaps with at least part of an acceleration phase of the high performance seek profile so that the total current consumption of the data storage device does not exceed a current limit. Also in the embodiment of FIG. 5, the delay causes a constant velocity phase of the reduced performance seek profile to at least partially overlap with a deceleration phase of the high performance seek profile, again to prevent the total current consumption from exceeding the current limit. In this embodiment, delaying the reduced performance seek profile increases the seek time of the low priority VCM as shown in FIG. 5, but the reduction in seek performance is not as bad as independently seeking each VCM (e.g., one after the other). As described above, a delayed seek profile such as shown in FIG. 5 may be used as the reduced performance seek profile for reasons other than limiting the total current consumption (e.g., to provide more braking power the high priority VCM during an emergency unload).

The seek profiles shown in FIG. 3 and FIG. 5 are for illustration and not necessarily the seek profiles employed in a production disk drive. In addition, the reduced performance seek profile may differ from the high performance seek profile in aspects other than acceleration/deceleration amplitude or a delay offset. For example, in one embodiment the reduced performance seek profile 44 shown in FIG. 5 may have a non-zero amplitude during the delay at the beginning of the seek so as to at least start the seek of the low priority VCM without the total current consumption exceeding the current limit. Similarly, the reduced performance seek profile may have a non-zero amplitude during the deceleration phase of the high priority seek profile to at least start slowing the low priority VCM sooner which may help reduce the seek time of the low priority VCM. In this embodiment, the shape of the high priority VCM may be adjusted (e.g., by reducing the acceleration/deceleration amplitude) in order to improve the average performance of both VCMs while satisfying any suitable design constraint, such as a system current limit or a braking power limit during an emergency unload operation.

Figure 6:
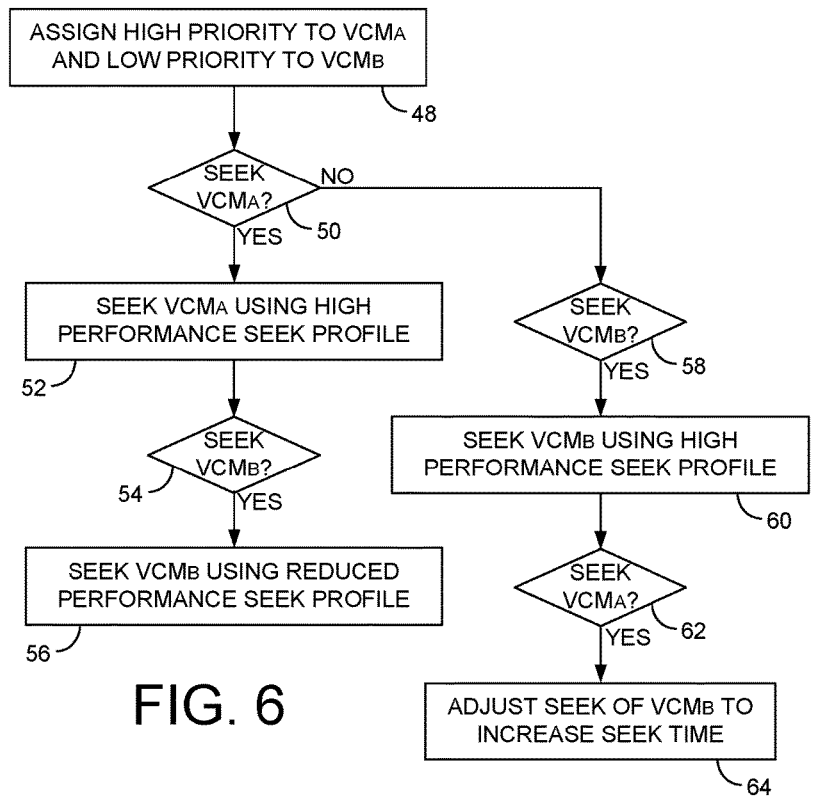
FIG. 6 is a flow diagram according to an embodiment wherein the seek of the low priority VCM is adjusted if a seek of the high priority VCM is initiated while seeking the low priority VCM.

FIG. 6 is a flow diagram according to an embodiment wherein a high priority is assigned to $VCM_A$ in FIG. 2A, and a low priority is assigned to $VCM_B$ (block 48) using any suitable criteria. If a seek is required for $VCM_A$ (block 50), for example, to service an access command, a high performance seek profile is used to seek $VCM_A$ (block 52). If a concurrent seek is required for $VCM_B$ (block 54), a reduced performance seek profile is used to seek $VCM_B$ (block 56). If a seek is not required for $VCM_A$ at block 50, and a seek is started for $VCM_B$ at block 58, a high performance seek profile is used to start the seek of $VCM_B$ (block 60). If during the seek of $VCM_B$ a concurrent seek of $VCM_A$ is required (block 62), the seek of $VCM_B$ is adjusted based on the reduced performance seek profile, thereby increasing the seek time of $VCM_B$ (block 64). For example, the seek of $VCM_B$ may be adjusted to reduce the amplitude of the acceleration or deceleration phase of the seek profile similar to the reduced amplitude shown in FIG. 3, thereby enabling a high performance seek profile to concurrently seek the high priority VCM ($VCM_A$ in this example). In one embodiment, adjusting the seek profile for the low priority VCM may result in a slipped revolution due to missing the target data sector during the current revolution of the disk. In another embodiment, the seek profile for the low priority VCM may be adjusted based on a rotational position optimization (RPO) algorithm that may select a secondary access command to service. That is, the RPO algorithm may select a different access command to service on-the-fly based on the adjusted seek profile in order to avoid the performance loss of a slipped revolution.

Figure 7:
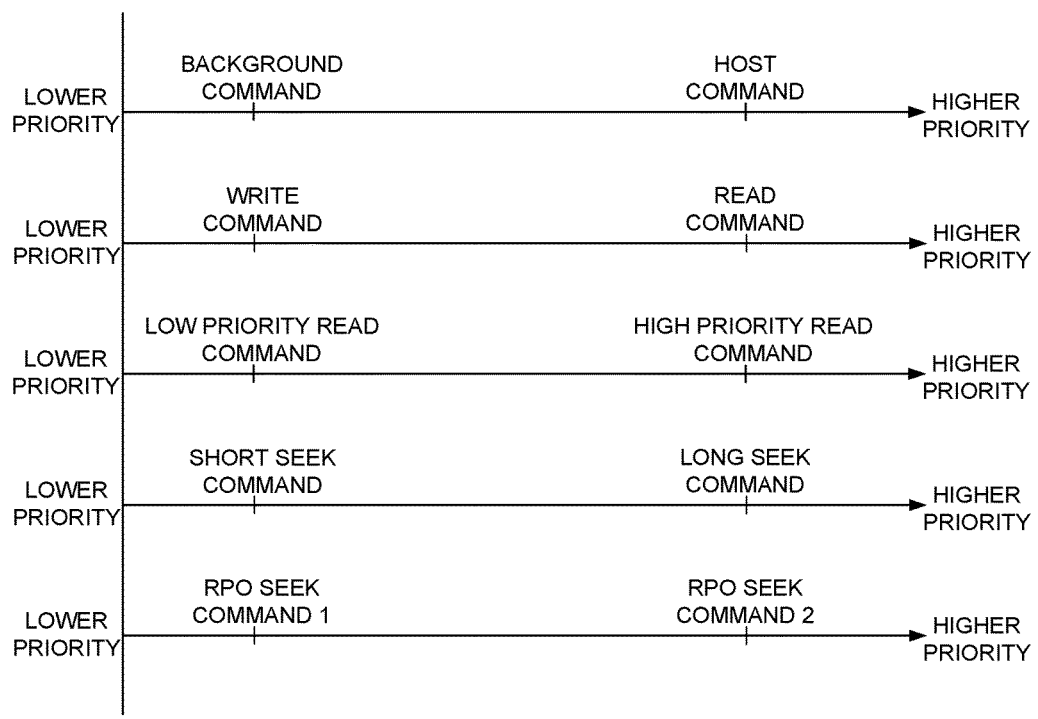
FIG. 7 shows an embodiment wherein a number of different factors are evaluated when assigning high/low priority to each VCM.

In one embodiment, a number of factors may be evaluated such as shown in FIG. 7 to assign the priority levels when concurrently seeking multiple VCMs. In one embodiment, a low priority may be assigned to a VCM that services a background command whereas a high priority may be assigned to a VCM that services a host command (write/read command). A background command may include, for example, a read/write command during a garbage collection operation, a read/write command during a read-verify-write operation, a read/write command during a defect scan operation, etc. In this embodiment, a background command may be considered lower priority since it typically does not impact the performance of the disk drive as seen from the host. That is, in one embodiment the execution of background commands is delayed using reduced performance seeks so that the higher priority host commands can be serviced faster using high performance seeks.

In another embodiment illustrated in FIG. 7, a host read command may be assigned higher priority than a host write command since the host write data may be temporarily cached either in a volatile or non-volatile semiconductor memory before written to the disk. The host may be notified of command completion as soon as the write data is cached, whereas a host read command is not considered complete until the data has been read from the disk and transferred to the host. In one embodiment, the disk drive may implement shingled magnetic recording so that the data of a write command can be written to any disk surface (using dynamic mapping of the data sectors). In this embodiment when concurrently servicing a host read command and a host write command, the disk surface (and corresponding VCM) needed to service the host read command is assigned high priority and a different disk surface (and corresponding VCM) selected to service the host write command is assigned low priority.

In another embodiment shown in FIG. 7, a priority may be associated with host read commands, for example, based on an "age" of each read command buffered in a command queue, based on a quality of service (QoS) attribute assigned to each read command, based on a size of each read command, etc. In this embodiment, the priority of each read command may be used when assigning the high/low priority to the respective VCMs when concurrently servicing multiple read commands. That is, the higher priority read commands may be serviced faster by using a high performance seek profile.

In yet another embodiment shown in FIG. 7, the high/low priority may be assigned to each VCM based on a seek length of the access commands. For example, in one embodiment the access command having the longer seek length may be assigned a higher priority so that the average seek time for the access commands is minimized. In still another embodiment shown in FIG. 7, the priority assigned to each VCM may be determined as part of an RPO algorithm. An RPO algorithm typically selects the access commands for execution based on an order that minimizes the access latency (the seek latency to seek the head to a target track, as well as the rotational latency for the head to reach the target data sector). In this embodiment, the RPO algorithm may compute a seek latency for each access command in a command queue using different priority seek profiles (e.g., high/low priority), and then configure the execution order of the access commands so as to minimize the overall access latency. That is, when multiple access commands can be executed concurrently using multiple VCMs, and when at least one VCM is controlled based on a reduced performance seek profile (e.g., to limit the total current consumption), the RPO algorithm may evaluate the access latency of each access command based on at least two different seek profiles and then configure the execution order and priority of the VCMs so as to minimize the overall access latency.

In one embodiment, a combination of factors such as shown in FIG. 7 may be evaluated when assigning the priority to each VCM to facilitate concurrent seek operations. For example, each factor may be given a priority score and the sum of the priority scores for each VCM may be used to configure the priority and corresponding seek profile for each VCM.

In one embodiment, when seeking a single VCM an even higher performance seek profile may be used (e.g., as compared to the high performance seek profile 36 shown in FIG. 3) since more current may be available to seek a single VCM. For example, the high performance seek profile used at block 30 of FIG. 2C or block 60 of FIG. 6 may be the highest performance seek profile available for the second $VCM_B$ when not concurrently seeking the first $VCM_A$, thereby reducing the seek time for the second $VCM_B$. Referring again to FIG. 6, in one embodiment an individual seek of the high priority VCM (e.g., $VCM_A$) may begin with a first high (e.g., highest) performance seek profile at block 52, and when a concurrent seek of the low priority VCM (e.g., $VCM_B$) is initiated, the seek profile of the high priority VCM may be adjusted to a second high performance seek profile in order to reduce the current consumption of the high priority VCM at the cost of increasing the seek time.

In one embodiment the high performance and reduced performance seek profiles used to seek the VCMs may be the same across the VCMs. In another embodiment, the seek profiles may be different for each VCM, for example, due to manufacturing differences between each VCM. In one embodiment each seek profile (high performance and reduced performance) may be calibrated for each VCM so as to compensate for manufacturing differences.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a first voice coil motor (VCM) configured to actuate a first head over a first disk;
a second VCM configured to actuate a second head over a second disk; and
control circuitry configured to:
assign a high priority to the first VCM and a low priority to the second VCM;
service a first access command using the first head by seeking the first VCM using a first high performance seek profile; and
service a second access command using the second head by at least:
when seeking the second VCM without seeking the first VCM, seeking the second VCM using a second high performance seek profile; and
when concurrently seeking the first VCM and the second VCM, seeking the first head using the first high performance seek profile and seeking the second VCM using a reduced performance seek profile,
wherein the second high performance seek profile decreases a seek time of the second VCM compared to the reduced performance seek profile.

2. The data storage device as recited in claim 1, wherein the reduced performance seek profile limits a peak current consumption of the data storage device when concurrently seeking the first and second VCMs.

3. The data storage device as recited in claim 1, further comprising a spindle motor configured to rotate the first and second disks, wherein:
during a power failure the first and second disks rotating causes the spindle motor to generate a back electromotive force (BEMF) voltage; and
the reduced performance seek profile increases a braking power supplied by the BEMF voltage to the first VCM during the power failure.

4. The data storage device as recited in claim 1, wherein the reduced performance seek profile comprises delaying the seek of the second VCM.

5. The data storage device as recited in claim 4, wherein the delay overlaps with at least part of an acceleration phase of the first high performance seek profile.

6. The data storage device as recited in claim 4, wherein the delay causes a constant velocity phase of the reduced performance seek profile to at least partially overlap with a deceleration phase of the first high performance seek profile.

7. The data storage device as recited in claim 1, wherein when seeking the second VCM using the second high performance seek profile and a seek of the first VCM is initiated, the control circuitry is further configured to adjust the seeking of the second VCM to increase the seek time of the second VCM.

8. The data storage device as recited in claim 1, wherein the control circuitry is further configured to assign the low priority to the second VCM when the second access command is a background command generated by the control circuitry.

9. The data storage device as recited in claim 1, wherein the control circuitry is further configured to assign the low priority to the second VCM when the first access command is a read command received from a host and the second access command is a write command received from the host.

10. The data storage device as recited in claim 1, wherein the control circuitry is further configured to assign the low priority to the second VCM when the first access command is a high priority read command and the second access command is a low priority read command.

11. The data storage device as recited in claim 1, wherein the control circuitry is further configured to:
compare a first seek length of the first access command serviced using the first head to a second seek length of the second access command serviced using the second head; and
assign the low priority to the second VCM based on the comparison.

12. The data storage device as recited in claim 11, wherein the control circuitry is further configured to assign the low priority to the second VCM when the second seek length is longer than the first seek length.

13. The data storage device as recited in claim 1, wherein the control circuitry is further configured to:
select an access command to execute based on a rotational position optimization (RPO) algorithm; and
assign the low priority to the second VCM based on the RPO algorithm.

14. A method of operating a data storage device, the method comprising:
assigning a high priority to a first voice coil motor (VCM) and a low priority to a second VCM;
servicing a first access command using a first head by seeking the first VCM using a first high performance seek profile; and
servicing a second access command using a second head by at least:
when seeking the second VCM without seeking the first VCM, seeking the second VCM using a second high performance seek profile; and
when concurrently seeking the first VCM and the second VCM, seeking the first head using the first high performance seek profile and seeking the second VCM using a reduced performance seek profile,
wherein the second high performance seek profile decreases a seek time of the second VCM compared to the reduced performance seek profile.

15. The method as recited in claim 14, wherein the reduced performance seek profile limits a peak current consumption of the data storage device when concurrently seeking the first and second VCMs.

16. The method as recited in claim 14, further comprising generating a back electromotive force (BEMF) voltage using a spindle motor during a power failure, wherein the reduced performance seek profile increases a braking power supplied by the BEMF voltage to the first VCM during the power failure.

17. The method as recited in claim 14, wherein the reduced performance seek profile comprises delaying the seek of the second VCM.

18. The method as recited in claim 17, wherein the delay overlaps with at least part of an acceleration phase of the first high performance seek profile.

19. The method as recited in claim 17, wherein the delay causes a constant velocity phase of the reduced performance seek profile to at least partially overlap with a deceleration phase of the first high performance seek profile.

20. The method as recited in claim 14, wherein when seeking the second VCM using the second high performance seek profile and a seek of the first VCM is initiated, further comprising adjusting the seeking of the second VCM to increase the seek time of the second VCM.

21. The method as recited in claim 14, further comprising assigning the low priority to the second VCM when the second access command is a background command.

22. The method as recited in claim 14, further comprising assigning the low priority to the second VCM when the first access command is a read command received from a host and the second access command is a write command received from the host.

23. The method as recited in claim 14, further comprising assigning the low priority to the second VCM when the first access command is a high priority read command and the second access command is a low priority read command.

24. The method as recited in claim 14, further comprising:
    comparing a first seek length of the first access command serviced using the first head to a second seek length of the second access command serviced using the second head; and
    assigning the low priority to the second VCM based on the comparison.

25. The method as recited in claim 24, further comprising assigning the low priority to the second VCM when the second seek length is longer than the first seek length.

26. The method as recited in claim 14, further comprising:
    selecting an access command to execute based on a rotational position optimization (RPO) algorithm; and
    assigning the low priority to the second VCM based on the RPO algorithm.

\* \* \* \* \*